July 27, 1965
H. M. VALENTINE
3,196,891
STEP-UP RELAY VALVE
Filed Jan. 28, 1963
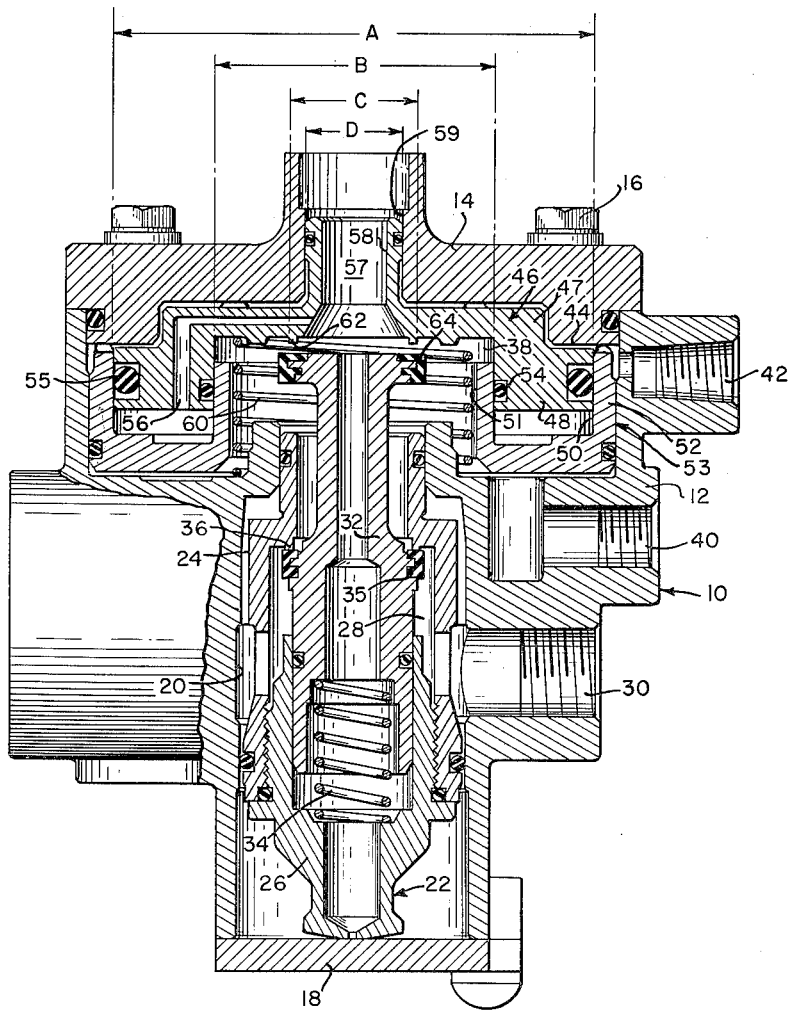
HARRY M. VALENTINE INVENTOR
BY Scrivener & Parker
ATTORNEY

3,196,891
STEP-UP RELAY VALVE

Harry M. Valentine, Elyria, Ohio, assignor to Bendix-Westinghouse Automotive Air Brake Company, Elyria, Ohio, a corporation of Delaware
Filed Jan. 28, 1963, Ser. No. 254,377
3 Claims. (Cl. 137—102)

This invention relates to relay valves and more particularly to relay valves of the step-up variety which are especially adapted to deliver from a source of high pressure, variable output pressures which are proportionately higher than variable control pressures.

Though step-up relay valves are old and well known, such valves are usually constructed to deliver pressures which bear a fixed ratio to lower control pressures, that is to say, no means are provided for readily varying the ratio without extensive rebuilding of the original valve or the use of other valves.

The object of the present invention is to provide a step-up relay valve wherein the ratio of control to delivery pressure can be readily varied with a minimum of time and effort.

More particularly, it is an object of the invention to provide a step-up relay valve wherein the control piston is paired with a spacer element of particular design and wherein when a different ratio is desired, the first piston and spacer set is readily replaced by a second paired set which provides the second selected ratio.

Other objects and their attendant advantages will become apparent as the following description is read in conjunction with the accompanying single figure which illustrates a step-up relay embodying the features of the invention.

In the drawing the numeral 10 designates a valve casing having a hollow body part 12 closed at its upper end by an enlarged cap member 14 which is fastened to the body member by machine screws 16. The lower end of the casing 12 is covered by a smaller cap 18, the elongated cavity 20 covered by the cap 18 containing a barrel 22 composed of an upper member 24 which is threaded to a lower member 26. The two members 24, 26 are immobile within the casing 12 and to all intents and purposes can be considered an integral part of the casing.

The interior of the barrel 24 contains a pressure cavity 28 connected to a source of high pressure by way of a port 30. Slideable within the cavity 28 is a plunger 32 which is urged upwardly by a spring 34 so that an annular delivery valve element 35 is normally seated on a valve seat 36 to prevent the flow of pressure from the high pressure cavity 28 to a delivery cavity 38, which is adapted to be connected to a pressure operated device (not shown) by way of a delivery port 40.

A control port 42, at the upper end of the casing 12 and adapted to be connected to a source of control pressure (not shown), leads to a control cavity 44 which is separated from the delivery cavity 38 by a control piston 46 having a downturned skirt part 47 on the lower end of which is an integral annular flange 48 slideably received in an annular channel 50 formed between side walls 51, 52 of a pressure ratio ring 53 fixed in the control cavity 44 and constructed in accordance with the invention. The function of the ratio ring 53 is more particularly described hereinafter.

The space in the channel beneath the piston flange 48 is sealed from the control and delivery cavities by O-rings 54, 55 received in grooves in the flange and adapted to sealingly abut the confronting inner surfaces of the respective side walls 51, 52 and this space is connected at all times to atmosphere by way of a passage 56 leading to an exhaust port 57 through an upstanding neck part 58 integral with the piston 46 and slideably received in an exhaust opening 59 in the cap 14. The piston 46 is normally urged by a spring 60 to its upper position of the drawing whereby an exhaust valve seat 62 on the piston 46 is out of engagement with an exhaust valve 64 integral with the upper end of the plunger 32.

In operation, when control pressure is admitted to the control port 42 it acts on top of the piston 46 over its entire area defined by the diameter A of the piston and the outer wall 52 of the ratio ring, less the area D defined by the outer diameter of the exhaust neck 58. This pressure acts to move the piston downwardly until the exhaust valve seat 62 seats on the valve member 64 thus disconnecting the delivery cavity 38 from atmosphere. As the piston continues to move downwardly it unseats the delivery valve 35 from the seat 36 thereby connecting the high pressure port 30 through the delivery cavity 38 to the delivery port 40 and thence to the device to be actuated. As the pressure builds up in the cavity 38 it acts against the area on the underside of the piston defined by the diameter B of the inner side of the channel wall 51 less the area of the exhaust valve seat 62 defined by the diameter C. When delivery pressure acting on the smaller area (B–C) reaches a level greater than the control pressure acting on the larger area (A–D) so as to create an upward force which balances the downward force, the spring 60 acts to move the piston upwardly until delivery valve 35 seats whereupon the valve is said to be lapped with both the delivery and exhaust valves 35, 64 in closed positions. Obviously, subsequent variation in control pressure effects variation in the proportionately higher delivery pressure in a manner well recognized by those skilled in the art.

The operation of the valve of the invention as above described is substantially the same as known step-up relay valves. The particular feature of the present invention which distinguishes it from known valves is the unique structure of the piston 46 and its mating ratio ring 53. It will be observed that the effective areas above and below the pistons are functions of the lateral width of the piston flange 48 as well as the lateral thickness or positions of the side walls 51, 52 of the ratio ring; or, expressed differently, a function of the lateral width of the channel 50 in the ratio ring. For example, if the ratio ring were provided with a narrower channel with the outer wall 52 being disposed as in the drawing but with the inner wall 51 moved radially outwardly so as to be closer to the wall 52, and the lateral width of the piston flange 48 were to be correspondingly decreased, the effective area of the underside of the piston would be increased so that the ratio of control to delivery pressure would be decreased. On the other hand, if the thickness of the outer wall 52 were to be increased while the inner wall 51 remained located is in the drawing, and the lateral width of the piston flange 48 was likewise decreased, the effective area of the upper side of the piston would be decreased while the effective areas of the lower side would remain unchanged, thereby effecting a different ratio between control and delivery pressures.

From what has been said above, it will be apparent that a large number of size variations in the piston and ratio ring may be resorted to for effecting different ratios. The invention contemplates providing for each valve casing a series of paired pistons and ratio rings which will produce any of a selected series of pressure ratios as, for example, 1:1, 1:2, 1:3, etc. Whenever it is desired to change from one ratio to another it is only necessary to remove cap screws 16 and cover 14, lift out the installed piston and ratio ring and replace with a second set giving the desired new ratio. No piping whatever need be disconnected and no further disassembly of any kind is required of the valve to effect the desired change.

Though a preferred embodiment of the invention has been shown and described it will be apparent that the valve of the invention is susceptible of a variety of changes and modifications without, however, departing from the scope and spirit of the appended claims.

What is claimed is:

1. In a relay valve of the step-up type which includes a casing having a pressure supply port, a pressure delivery port, a pressure control port and an exhaust port, delivery and exhaust valves constructed and arranged to control communication between said supply and delivery ports and between the delivery and exhaust ports, respectively, and means for biasing the delivery and exhaust valves toward closed position, the improvement which comprises an annular ratio ring and a cooperating piston, means for biasing said piston in opposition to the control pressure, the delivery and exhaust valves being related with each other and with the piston so that they may either both be closed or alternately open, the exhaust valve being closed and the delivery valve opened by an increase in control pressure acting on one side of the piston sufficient to overcome the effect of both said biasing means and the force of the delivery pressure acting on the reverse side of the piston, said ring and piston coacting to separate the casing into control and delivery chambers respectively communicating with the control port and the delivery port, said ratio ring having inner and outer spaced-apart walls defining an open channel, said outer wall sealingly engaging the wall of the casing surrounding the control chamber and said inner wall having the side thereof opposite said channel exposed to the interior of said delivery chamber, said piston having a depending skirt provided with an annular flange positioned within said channel and slidingly and sealingly engaging confronting surfaces of said walls whereby the area of the piston exposed to pressure in said delivery chamber is less than the area of the piston exposed to pressure in said control chamber by an amount equal to the annular area of said channel between said walls.

2. In the step-up relay valve of claim 1 wherein the upper side of said control chamber is open across the outer diametrical width of said ring and a cover member removably closes said open end of said control chamber whereby upon removal of said cover member said piston and ratio ring may be removed as a unit from said casing.

3. In the valve of claim 1 including means connecting the space in said channel beneath the lower part of said skirt at all times to atmosphere.

References Cited by the Examiner

UNITED STATES PATENTS 2,937,052   5/60   Gates _____ 137—102 XR
2,985,490   5/61   Gates _____ 137—102 XR ISADOR WEIL, *Primary Examiner.*